US008676854B2

(12) United States Patent
Gruen et al.

(10) Patent No.: US 8,676,854 B2
(45) Date of Patent: Mar. 18, 2014

(54) COMPUTER METHOD AND APPARATUS FOR USING SOCIAL INFORMATION TO GUIDE DISPLAY OF SEARCH RESULTS AND OTHER INFORMATION (75) Inventors: Daniel M. Gruen, Newton, MA (US); Jesse H. Kriss, Cambridge, MA (US); Martin M. Wattenberg, Wellesley, MA (US)

(73) Assignee: International Business Machines Corporation, Amonk, NY (US)

( * ) Notice: Subject to any disclaimer, the term of this patent is extended or adjusted under 35 U.S.C. 154(b) by 1020 days.

(21) Appl. No.: 12/050,674

(22) Filed: Mar. 18, 2008

(65) Prior Publication Data
US 2009/0240676 A1  Sep. 24, 2009

(51) Int. Cl.
G06F 7/00 (2006.01)
G06F 17/30 (2006.01)

(52) U.S. Cl.
USPC .......................................... 707/796; 707/723

(58) Field of Classification Search
USPC .................... 707/722, 793, 796–798
See application file for complete search history.

(56) References Cited

U.S. PATENT DOCUMENTS

| 7,000,194 | B1 | 2/2006 | Newbold | |
|---|---|---|---|---|
| 7,343,365 | B2 * | 3/2008 | Farnham et al. | 715/853 |
| 7,519,542 | B1 * | 4/2009 | Waingold | 705/7.11 |
| 7,685,236 | B1 * | 3/2010 | Harik et al. | 709/205 |
| 7,702,685 | B2 * | 4/2010 | Shrufi et al. | 707/760 |
| 7,818,394 | B1 * | 10/2010 | Lawler et al. | 709/217 |
| 7,844,671 | B1 * | 11/2010 | Lawler et al. | 709/206 |
| 2002/0059201 | A1 | 5/2002 | Work | |
| 2002/0116466 | A1 | 8/2002 | Trevithick et al. | |
| 2002/0124053 | A1 | 9/2002 | Adams et al. | |
| 2002/0147710 | A1 | 10/2002 | Hu | |
| 2002/0161838 | A1 | 10/2002 | Pickover et al. | |
| 2002/0169737 | A1 * | 11/2002 | Armstrong et al. | 706/59 |
| 2002/0178161 | A1 | 11/2002 | Brezin et al. | |
| 2004/0114735 | A1 | 6/2004 | Arning et al. | |

(Continued)

FOREIGN PATENT DOCUMENTS

EP  1 672 544 A2  6/2006
JP  2000066970  3/2000

OTHER PUBLICATIONS

Aiello, W., et al., "Analysis of Communities of Interest in Data Networks," C. Dovrolis (Ed):PAM, LNCS 3431, pp. 83-96 (2005).

(Continued)

Primary Examiner — Jeffrey A Burke
(74) Attorney, Agent, or Firm — Hamilton, Brook, Smith & Reynolds, P.C.

(57) ABSTRACT

A computer implemented method and system presents search result or other data generated in response to a request by a user. The search results are formed of one or more items. The invention system corresponds each item to a respective person. A screen view is generated showing a hierarchy of people including the people corresponding to the items of the search results. Indicated in the screen view is the extent of connectedness between the user and the people corresponding to the items of the search results. The invention system displays indications of the items of the search results in the screen view in a manner illustrating the items in context of the shown hierarchy. This enables a user to (i) easily and readily assign respective confidence levels to items of the search results, and to (ii) determine relationships among people without explicitly requesting the information from others.

21 Claims, 4 Drawing Sheets

(56) References Cited

U.S. PATENT DOCUMENTS

| | | | |
|---|---|---|---|
| 2004/0122803 A1 | 6/2004 | Dom et al. | |
| 2005/0050158 A1 | 3/2005 | Solari | |
| 2005/0076053 A1* | 4/2005 | Katayama et al. | 707/102 |
| 2005/0091202 A1 | 4/2005 | Thomas | |
| 2005/0171832 A1 | 8/2005 | Hull et al. | |
| 2006/0026298 A1* | 2/2006 | Zeng et al. | 709/240 |
| 2006/0036562 A1 | 2/2006 | Wu | |
| 2006/0047615 A1 | 3/2006 | Ravin et al. | |
| 2006/0064404 A1 | 3/2006 | Kishore et al. | |
| 2006/0064431 A1 | 3/2006 | Kishore et al. | |
| 2006/0129538 A1* | 6/2006 | Baader et al. | 707/3 |
| 2006/0248573 A1* | 11/2006 | Pannu et al. | 726/1 |
| 2006/0271859 A1 | 11/2006 | Gorzcla | |
| 2006/0294134 A1* | 12/2006 | Berkhim et al. | 707/102 |
| 2007/0028189 A1* | 2/2007 | Robbins | 715/853 |
| 2007/0118539 A1 | 5/2007 | Hildrum et al. | |
| 2007/0198514 A1* | 8/2007 | Schwenke et al. | 707/7 |
| 2007/0271232 A1* | 11/2007 | Mattox et al. | 707/3 |
| 2008/0104024 A1* | 5/2008 | Kumar et al. | 707/3 |
| 2008/0195586 A1* | 8/2008 | Arnold et al. | 707/3 |
| 2009/0006427 A1* | 1/2009 | Veeraraghavan et al. | 707/100 |
| 2009/0210391 A1* | 8/2009 | Hall et al. | 707/3 |
| 2011/0078188 A1* | 3/2011 | Li et al. | 707/776 |

OTHER PUBLICATIONS

Baeza-Yates, B. and Ribeiro-Neto, B., "Modern Information Retrieval," *Ranking,* Chapter 13.4.4, pp. 380-382 (1999).

Cortes, C., et al., "Communities of Interest," *Intelligent Data Analysis,* IOS Press, vol. 6, pp. 211-219 (2002).

Dyson, E., "Social Networks—The Good and the Bad and How they Could be Improved . . . " http://networks.silicon.com/webwatch/0,39024876,39122283,00.htm retrieved from the World Wide Web on Mar. 10, 2008, (2004).

Flake, G. W., et al., "Graph Clustering and Minimum Cut Trees," *Internet Mathematics,* vol. 1(4), pp. 385-408 (2004).

Flake, G.W., et al., "Efficient Identification of Web Communities," KDD, pp. 150-160 (2000).

Heer, J. and Boyd, D., "Vizster: Visualizing Online Social Networks," 8 pages. jheer.org/publications/2005-Vizster-InfoVis.pdf retrieved from the World Wide Web on Mar. 10, 2008.

Ino, H., et al., "Partitioning of Web Graphs by Community Topology," *International World Wide Web Conference Committee,* pp. 661-669 (2005).

Kautz, H. and Selman, B. "Creating Models of Real-World Communities with ReferallWeb," www.cs.washington.edu/homes/kautz/talks rec98talk.ppt retrieved from the World Wide Web on Mar. 10, 2008.

Krebs, V., "The Social Life of Books—Visualizing Communities of Interest via Purchase Patterns on the WWW," http://www.organet.com/booknet.html retrieved from the World Wide Web on Mar. 10, 2008, (1999).

Raghavan, P. "Mining Social Networks for Knowledge Management" http://dimacs.rutgers.edu/Workshops/MiningTutorial/raghavan-slides.ppt#256,1,Miningdatasocialnetworks for knowledge management Prabhakar Raghavan retrieved from the World Wide Web on Mar. 11, 2008.

* cited by examiner

COMPUTER METHOD AND APPARATUS FOR USING SOCIAL INFORMATION TO GUIDE DISPLAY OF SEARCH RESULTS AND OTHER INFORMATION

BACKGROUND OF THE INVENTION

When people search for documents, files or other forms of information, they are often interested in locating information from people they know and trust. This is both because they will have confidence in the validity of the information, and because they can more easily turn to people with whom they have a prior relationship to help them understand, prioritize, and apply the information, or help them locate related items. Also, studies have shown that people often search for documents or files as an intermediate step towards a main goal of locating a person or group of people with desired expertise. Understanding the social and organizational affiliation of the people involved in creating a document also provides context that suggests what kind of information is likely to be contained. Yet current search tools do little to surface information about the relationship of the people associated with information and the person conducting the search, or about the organizational and social affiliation of those people. Users have reported this as a limitation of current search tools: while the tool may return numerous items, without assistance from someone they trust users won't know which items to rely on or apply in the situation at hand.

SUMMARY OF THE INVENTION

The current invention displays search results in the context of a navigable visualization that depicts information about the people associated with the search result items, such as their organizational and social affiliations and—importantly—their connection to the user.

In one embodiment, a computer implemented method and apparatus presents search result data as follows. Given search results generated in response to a request by a user, the search results being formed of one or more items, the invention system corresponds each item to a respective person. Next the invention system generates and provides a screen view showing a hierarchy of people including the people corresponding to the items of the search results. The invention system then indicates in the screen view extent of connectedness (level or degree of connectivity) between the user and the people corresponding to the items of the search results. Lastly the invention system displays indications of the items of the search results in the screen view in a manner illustrating the items in context of the shown hierarchy. This enables the user to readily/visually:

determine a level of confidence in the items,
determine relationship to other people who authored respective items, and
discover relationships among people without explicitly requesting such.

Any variety of geometries, color schemes/coding, shading, indicators, symbols and the like or combination thereof may be employed in the screen view to illustrate the hierarchy of people, connectedness to the user and search result items.

Accordingly, the presentation of search results by embodiments of the present invention enables a user to visually arrive at a level of confidence/trust in search result items as shown in the context of a hierarchy of people relative to the user's social/people network.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

The current invention displays search results in the context of a visualization that depicts information about organizational affiliations and the users social network. Key to the present invention is the combination of three forms of information, in ways that can be easily browsed, seen and searched by a user. Non-limiting examples include a treemap-based visualization (detailed later in FIG. 1), an org chart or a nested outline.

The three forms of information are:
1. Meaningful content and searches on it;
2. An individual's personal or social relationships with people; and
3. An external (not specific to the individual) organizational structure such as a corporate hierarchy.

This enables several valuable capabilities as follows:
1. Knowledge of the organizational associations of a document help a user categorize it, predict what it is likely to contain, and determine the level of trust (or confidence) to apply to it.
2. One can discover documents authored by others in the same group or organization as people the user knows, even if the user does not have this own prior personal connection to them. For example, a user could see at a glance that there are no search hits authored by people that the users know, but there are several authored by someone in the same group as a number of people the user does know. In this way the user could then more easily contact that person, ask the people he knows for an introduction, or ask the people he knows about the author to help establish the level of trust (confidence) the user should place in the document.
3. Visually presenting such information affords the user the ability to discover such relationships and situations without specifically requesting them. And note that the combination of a user's personal relationship information, derived from the user's private communication history, with publicly available organizational information facilitates these connections without having to reveal information about the private communication patterns and relationship networks of others.

Figure 1:
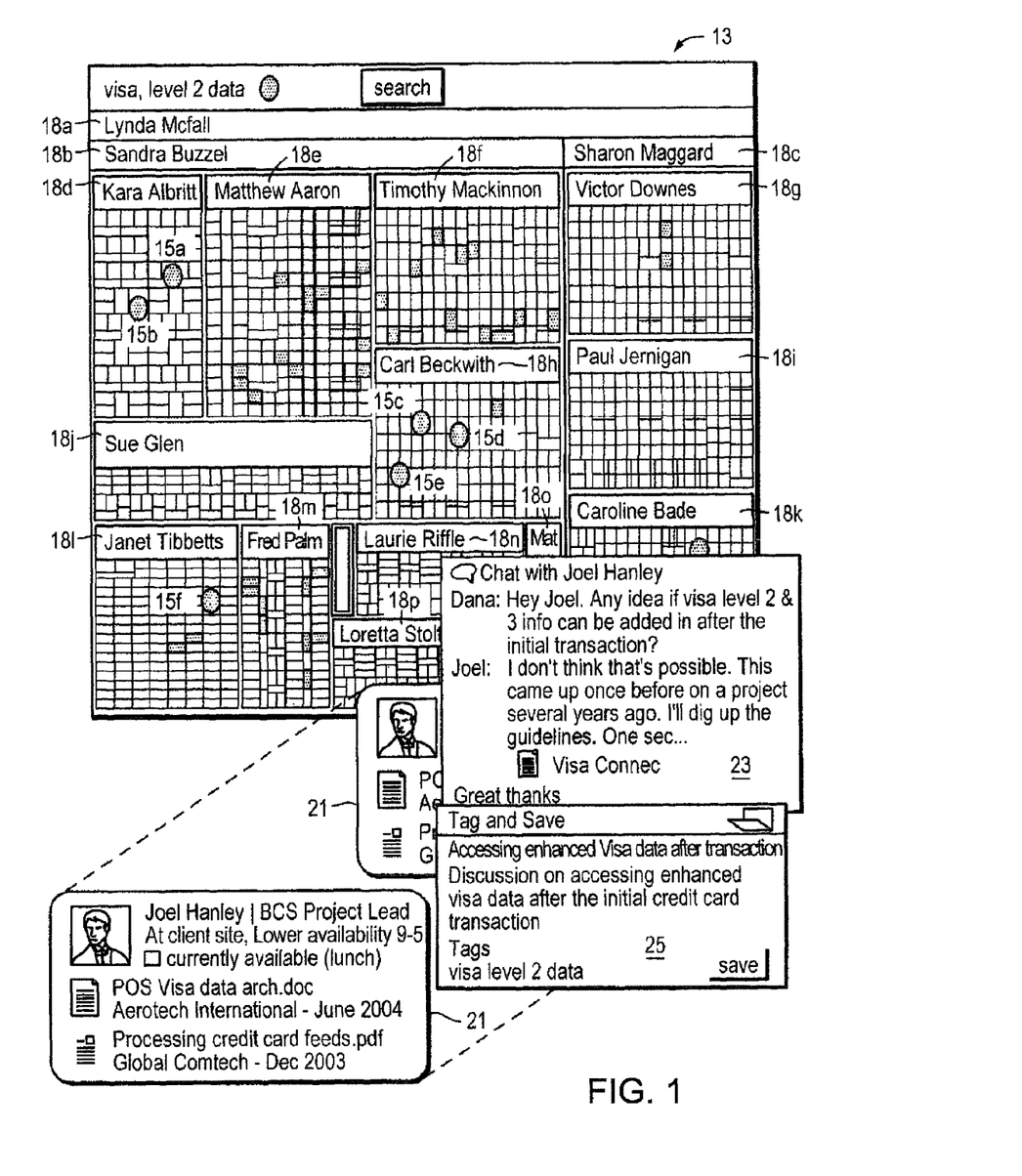
FIG. 1 is a schematic illustration and partially exploded view of the present invention display of search results in the context of a visualization of organizational hierarchy of people and the user's social network.

As a non-limiting example of the present invention, one possible implementation is depicted in FIG. 1. FIG. 1 starts with a social email treemap 13 visualization (work by Martin Wattenberg and Jesse Kriss, both IBM Research), in which each person 18a, b, c . . . n in an organization is represented by a respective set of rectangles. The rectangle representations 18 of different people are grouped by organizational affiliation, such as that represented by an organization's hierarchical reporting structure. So Lynda 18a is illustrated at a top level of the hierarchy. At a level immediately below her are represented Sandra 18*b* and Sharon 18*c*. Sandra 18*b* is illustrated as being hierarchically above Kara 18*d*, Matthew 18*e* and Timothy 18*f* on one level and other people 18*h*, 18*j*, 18*l*, 18*m*, 18*n*, 18*o*, 18*p* at respective subsequent (lower) levels of the hierarchy. Meanwhile Sharon 18*c* is represented as hierarchically at the top of a branch formed of Victor 18*g*, Paul 18*i* and Caroline 18*k*, at respective decreasing levels of the hierarchy.

For a given person, his set of rectangles 18 are shaded based on the extent of a person's social connection to the searcher-user (inferred by such things as volume of email correspondence, extent to which such correspondence is personally addressed, mutual attendance at meetings, length and recency of relationship, etc.) Known techniques are utilized to compute or determine such extent of connection (social connectivity) between the user and other people. How closely or remotely familiar the user is to a person is referred to here as "degree or level of connectivity" or "extent of connectedness." Other shading, color coding, color schemes and the like may be employed to indicate the user's social or generally people connectivity.

Results 15 of a search are depicted in the context of this visualization (social email treemap) 13, as orange circles 15*a, b, c, d, e, f,* for example. Other color coding, geometries and indicators may be used. The search results may be formed of one or more items. User gesture (for example, hovering the cursor, clicking/selecting, etc.) on a search result item 15 provides information about the person that the subject item 15 represents. Included in this information is live awareness information 21 and live-links 23 to contact the person, and information and links (generally 25) to related search results. Common linking technology is employed.

Figure 2:
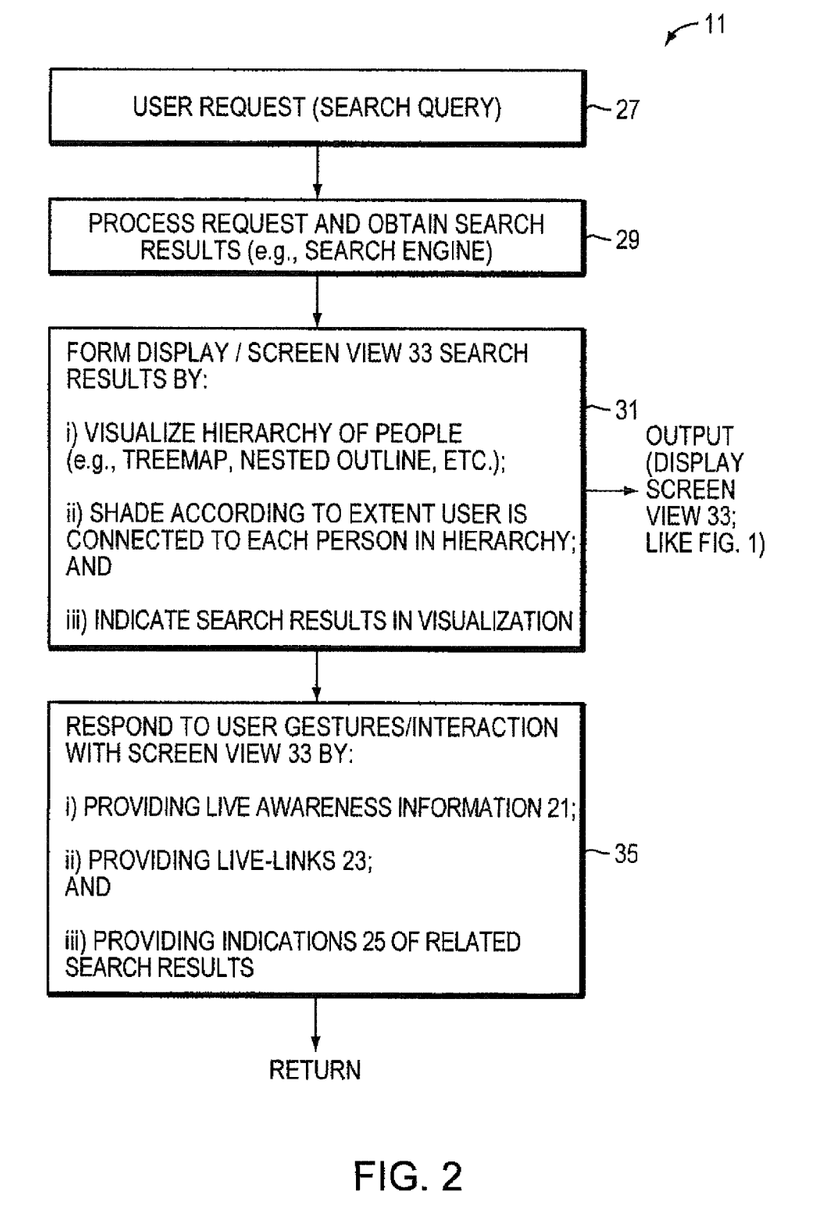
FIG. 2 is a flow diagram of one embodiment of the present invention.

FIG. 2 outlines the flow of control and operation in embodiments of the present invention. In FIG. 2 (at step 27), a user makes a request for search results or otherwise initiates a search. Included in the request or search query are specification of the information that the user desires. A search engine or similar system processor/engine at step 29 uses these specifications as parameters and parameter values and generates search results in response to the user's request.

In turn, the invention system 11 (or processor) at step 31 forms a screen view 33 to display or otherwise present the generated search results. Processor 31 accomplishes this by (i) visualizing a hierarchy of people corresponding to respective items forming the search results, (ii) applying shading to the screen view 33 contents as a function of extent that the user is connected to each person in the displayed hierarchy, and (iii) indicating the search results in the visualization. The hierarchy may be based on the reporting duties or responsibilities of personnel in a company/entity, or based on company organization and the like. The visualization of the hierarchy may be implemented or supported by a tree-like structure (e.g. the tree map 13 of FIG. 1), a linked list, a nested outline, and/or other data structures.

Processor 31 uses common techniques and determines the extent to which the user is connected to each person in the hierarchy. Next processor 31 shades, color codes or otherwise visually indicates in the subject screen view 33 how closely or remotely familiar the user is with each person in the hierarchy based on determined extent of connectedness (level or degree of connectivity).

In one embodiment, processor 31 indicates items of the search results as orange filled circles in the subject screen view 33. Any variety of geometric shapes, color schemes, shading and combinations thereof are suitable for indicating the search result items, the hierarchy of people and degree/level of user connectivity to people in the hierarchy displayed in the screen view 33. Overall the aspects presented in screen view 33 convey or illustrate the search results (items thereof) in context of the hierarchy of people (a social network of the user's generally). As such, the user is able to visually locate search result items from people he knows and trusts and thus has a degree of confidence in. In this way, the invention screen view 33 enables the user to (i) easily and readily assign respective confidence levels to items of the search results, and to (ii) determine relationships among people without explicitly requesting that information from others.

Continuing with FIG. 2, user-interaction with screen view 33 is supported at step 35. Specifically invention system 11 responds to user gestures (e.g. hovering of cursor over or selection of displayed people's names, search result items, etc.) by providing live awareness information 21, live links 23 and indicators of related search results 25.

Accordingly, this invention lets searcher-users easily see where there are items (search results) from people they know or who work in groups in which they already know a subset of the people. It helps the searcher-user locate items from people they are likely to trust, and furthers the goal of finding people they know with relevant expertise.

The invention can be extended in a number of ways, including:

1. representation of information from sources other than explicit user searches, including information in feeds from discussion databases, shared book marking systems, email systems, etc.
2. other techniques to group and organize people, such as buddy lists, mail groups, computed social networks, etc.
3. other visualization schemes or even simple sorted list views (ordered by extent of inferred social/trust relationship).

Figure 3:
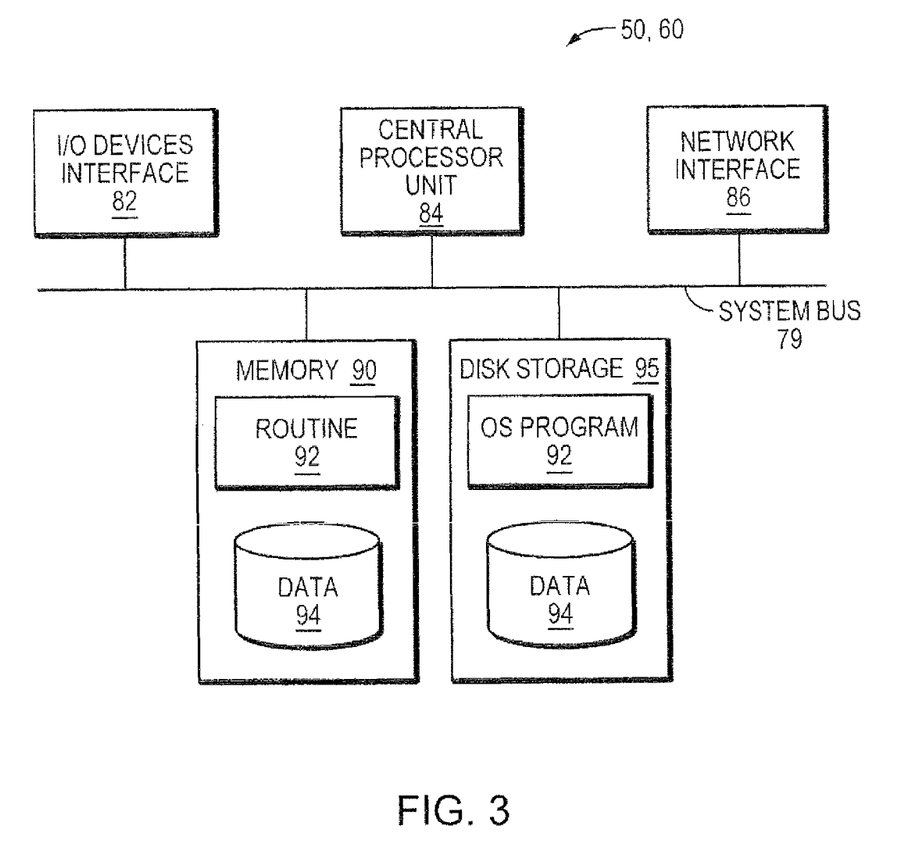
FIG. 3 is a schematic view of a computer network in which embodiments of the present invention operate.

FIG. 3 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 4:
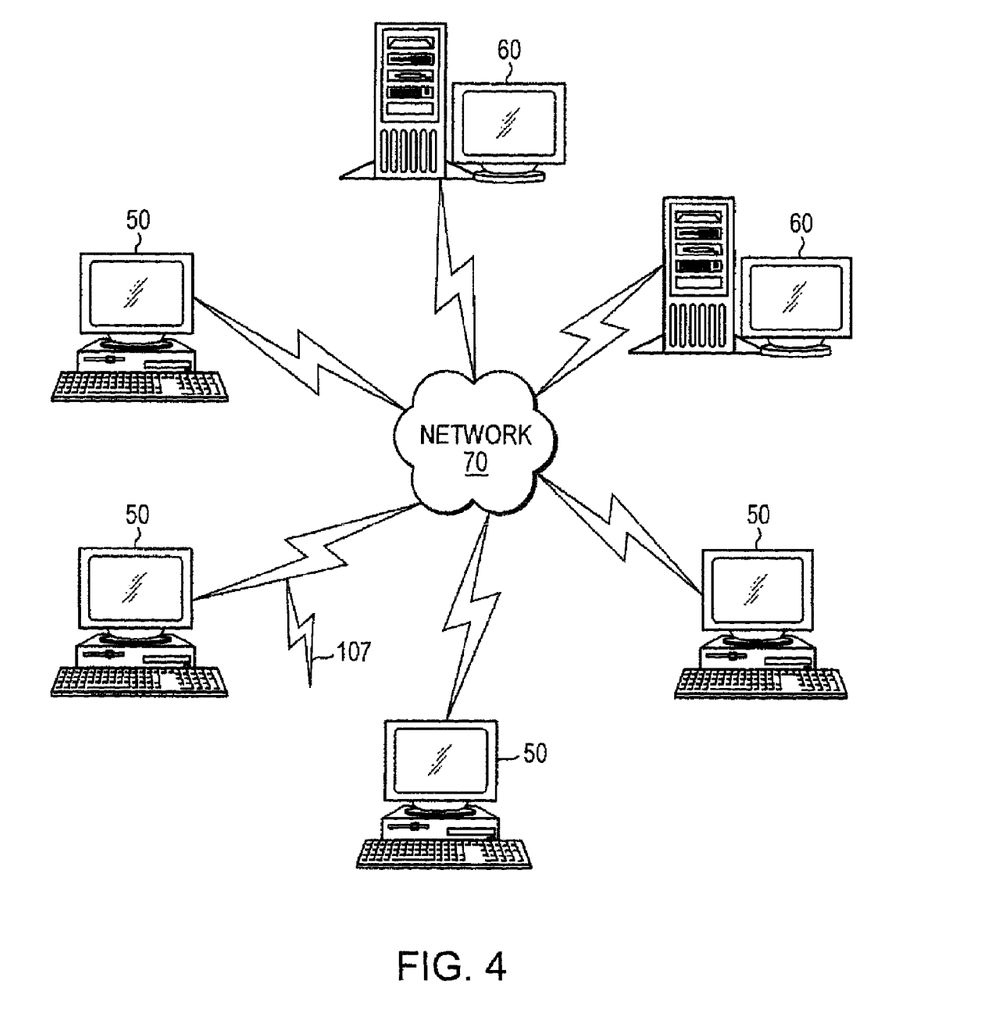
FIG. 4 is a block diagram of a computer node in the network of FIG. 3

FIG. 4 is a diagram of the internal structure of a computer (e.g., client processor/device 50 or server computers 60) in the computer system of FIG. 3. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 3). Memory 90 provides volatile storage for computer software instructions 92 and data 94 used to implement an embodiment of the present invention (e.g., processor 31, screen view 33 and supporting structures and code 11 detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

While this invention has been particularly shown and described with references to example embodiments thereof, it will be understood by those skilled in the art that various changes in form and details may be made therein without departing from the scope of the invention encompassed by the appended claims.

For example, the computer architecture and configurations of FIGS. 3 and 4 are for purposes of illustration and not limitation. Other configurations, architectures and implementations are suitable.

The foregoing description mentions exemplary geometric shapes, color/shading and organization of contents presented in the invention screen view/display of search results. Other geometries, color schemes/colors, shading and visual indicators, arrangements of data and presentation formats are suitable.

What is claimed is:

1. A computer implemented method of presenting search result data, comprising:

given search results generated in response to a request by a user, the search results being formed of one or more items, corresponding each item to a respective person;

providing a screen view illustrating organizational affiliations of the respective people corresponding to the items of the search results, wherein the screen view shows representations of different people grouped by their organizational affiliations, and per organizational affiliation the screen view shows organization hierarchy of the respective people, there being at least one organization that is non-specific to the user but includes the people corresponding to the items of the search results, such that the hierarchy is an external organizational structure with respect to the user, and such that the screen view showing the hierarchy indicates respective organizational affiliations of the people corresponding to the items of the search results;

indicating in the screen view extent of individual people connectedness between the user and the respective people corresponding to the items of the search results; and displaying indications of the items of the search results in the screen view in a manner illustrating the items in context of the shown hierarchy.

2. A method as claimed in claim 1 wherein the shown hierarchy is based on organization of a company or reporting hierarchy of company personnel.

3. A method as claimed in claim 1 wherein extent of individual people connectedness to the user is indicated by shading.

4. A method as claimed in claim 1 wherein indications of the items of the search results have a certain geometric shape in the screen view.

5. A method as claimed in claim 4 wherein the screen view utilizes respective sets of rectangles for showing different people in the hierarchy; and
the indications of the items of the search results are circular in shape.

6. A method as claimed in claim 4 wherein the indications of items of the search results are color coded.

7. A method as claimed in claim 1 wherein the step of displaying presents the items of the search results in context of the shown hierarchy and enables the user to:
determine a level of confidence in the items,
determine relationship to other people who authored respective items, and
discover relationships among people without explicitly requesting such.

8. A method as claimed in claim 1 wherein the screen view shows the hierarchy of people using a tree-like structure, a linked list or a nested outline.

9. A method as claimed in claim 1 further comprising the step of:
in response to user interaction, displaying in the screen view any one or combination of live awareness information, live links and related search results information.

10. Computer apparatus for presenting search results comprising:
a source of search results generated in response to a request by a user, the search results being formed of one or more items, each item corresponding to a respective person; and
a processor responsive to the source and generating a screen view illustrating organizational affiliations of the respective people corresponding to the items of the search results, wherein the screen view shows representations of different people grouped by their organizational affiliations, and per organizational affiliation the screen view shows organization hierarchy of the respective people, there being, at least one organization non-specific to the user such that the screen view shows on external organizational structure with respect to the user, and such that the screen view showing the hierarchy indicates respective organizational affiliations of the people corresponding to the items of the search results, the processor indicating in the screen view extent of individual people connectedness between the user and the respective people corresponding to the items of the search results, and the screen view illustrating the items in context of the hierarchy, the processor providing the screen view as output for display to the user.

11. Computer apparatus as claimed in claim 10 wherein the shown hierarchy is based on organization of a company entity, or a reporting hierarchy of company personnel.

12. Computer apparatus as claimed in claim 10 wherein extent of individual people connectedness to the user is indicated by shading in the screen view.

13. Computer apparatus as claimed in claim 10 wherein the screen view illustrates the items of the search results using a certain geometric shape.

14. Computer apparatus as claimed in claim 13 wherein the screen view utilizes respective sets of rectangles for showing different people in the hierarchy; and the indications of the items of the search results are circular in shape.

15. Computer apparatus as claimed in claim 14 wherein the screen view illustrates the items of the search results using a color coding.

16. Computer apparatus as claimed in claim 10 wherein the screen view enables the user to:
determine a level of confidence in the items,
determine relationship to other people who authored respective items, and
discover relationships among people without explicitly requesting such.

17. Computer apparatus as claimed in claim 10 wherein the screen view shows the hierarchy of people using a tree-like structure, a linked list or a nested outline.

18. Computer apparatus as claimed in claim 10 wherein in response to user interaction with the screen view, the processor outputs for display any one or combination of live awareness information, live links and related search result information.

19. Computer apparatus as claimed in claim 10 wherein the source of search results includes feeds from discussion data stores, shared book marking systems and email systems.

20. A computer system for presenting search results data, comprising:
given information generated by a computer for a user, the information being formed of one or more items, means for corresponding each item to a respective person,
screen display means for visualizing organizational affiliations and hierarchy of an organization per organizational affiliation of the respective people corresponding to the information items, there being at least one organization that is non-specific to the user such that the hierarchy of the one organization is of an external organizational structure with respect to the user, and such that the screen display means shows the hierarchy with indications of respective organizational affiliations of the people corresponding to the information items;
means for indicating in the visualization (i) extent of individual people connectivity of the user to the respective people corresponding to the information items, and (ii) the information items in context of the hierarchy,
such that the user is able to:
determine a level of confidence in the items,
determine relationship to other people who authored respective items, and
discover relationships among people without explicitly requesting such.

21. A computer program product comprising a non-transitory computer useable medium having a computer readable program, wherein the computer readable program when executed by a computer system causes:
given information generated in response to a request by a user, the information being formed of one or more items, corresponding each item to a respective person;
providing a screen view illustrating organizational affiliations of the respective people corresponding to the items of the generated information, the screen view showing representations of different people grouped by their organizational affiliations, and per organizational affiliation the screen view showing organization hierarchy of the respective people, there being at least one organization that is non-specific to the user but includes the respective people corresponding to the items of the generated information, such that the screen view shows an external organizational structure with respect to the user, and such that the screen view showing the hierarchy indicates respective organizational affiliations of the people corresponding to the items of the information;

indicating in the screen view extent of individual people connectedness between the user and the people respective corresponding to the items of the information; and displaying indications of the items in the screen view in a manner illustrating the items in context of the shown hierarchy.

* * * * *